SIGNAL RESPONSIVE DEVICE

Filed June 7, 1966 3 Sheets-Sheet 1

INVENTOR.
ROBERT K. BOOHER

BY Robert G. Rogers

ATTORNEY

INVENTOR.
ROBERT K. BOOHER
BY Robert D Rogers
ATTORNEY

*INVENTOR.*
ROBERT K. BOOHER

BY Robert G Rogers

ATTORNEY

United States Patent Office 3,484,625

Patented Dec. 16, 1969

3,484,625

SIGNAL RESPONSIVE DEVICE

Robert K. Booher, Downey, Calif., assignor to North American Rockwell Corporation, a corporation of Delaware Filed June 7, 1966, Ser. No. 555,726

Int. Cl. H03k 3/26

U.S. Cl. 307—289 9 Claims

ABSTRACT OF THE DISCLOSURE

An asynchronous flip flop function is implemented by a first gate having a data signal input and a first control signal imput for gating the data from the first gate to an output gate. The flip flop function also includes a second gate which has a feedback input from the output gate and a second control signal input for holding the logical state of the data at the output gate after the control signals have changed states. The outputs of the first and second gates are connected.

This invention relates to a gating arrangement for producing output signals which are the inverse of each other and, more particularly, to a combination of gates mechanizing a flip flop function using a plurality of control signals for producing output signals which are the inverse of each other.

Ordinarily, a flip flop is comprised of a plurality of components which are relatively easily assembled by prior art processes. However, the prior art processes are not easily adapted to produce various combinations of flip flops and logic gates on a single wafer.

The existing processes permit the forming of a plurality of like circuits, such as diodes, on a single wafer. As a result it is highly advantageous to be able to mechanize a flip flop function with logic gates because in that manner many combinations of flip flops and gates can be obtained. For example, a particular number of flip flops may be mechanized for performing a system function and because the mechanizing was done with diodes, the remaining diodes in the wafer can be used with the mechanized flip flop to make efficient use of all the components formed in the single wafer.

In a shift register the requirement for flip flops usually far exceeds the requirement for gates. It is desirable to be able to take a plurality of components and to fabricate the flip flops and the gates. On the other hand, within the same system, there may be a requirement for a converter using more gates than flip flops. In that case it is desirable to be able to fabricate the gates and the flip flops from the same plurality of components. Where the same components can be used for both, any desired ratio between the number of flip flops and gates can be obtained.

In the mechanization of the function it is further desirable to be able to produce the flip flop function with as few components as possible and with as few delays as possible. Delays may, for example, be caused each time a signal is gated through a gate combination. Existing schemes produce flip flop functions using three or four gating combinations, often referred to as logic levels, to denote a gate or plurality of gates through which a signal must be processed before becoming a final output signal.

Each necessary gate combination requires additional components and reduces the response time of the system. For example, a combination such as gates parallel connected and through which an input signal is gated and inverted is a logic level. At a subsequent combination, when the signal is used as an input to be gated to an output and inverted during the process, the signal may be described as having been passed through or gated through a second logic level. Each time the signal is gated through logic, a delay is incurred. Obviously, if fewer gating requirements are imposed on signals, fewer delays are incurred.

The present invention provides an improved gating arrangement for mechanizing a flip flop function, using a reduced number of components. The invention is compatible with the existing processes for producing a plurality of components in a single substrate.

The invention comprises gating means for propagating digital data from an input means to an output means as a function of a plurality of control signals.

In one embodiment, mechanizing an asynchronous flip flop function, the gating means comprises a first gate having a data signal input and a first control signal input for gating the data from the first gate to the output of an output means. The gating means includes a second gate having a feedback and a second control signal input for holding or maintaining the data at the output when the control signals change states. The gates have their outputs connected together and to the input of the output means. The input signal undergoes an inversion in being gated through the gating means and another inversion when passing through the output means. The first and second signals have a phase relationship such that the first signal becomes true before the second signal.

In another embodiment, mechanizing a synchronous flip flop, the data maintained at the first output comprises the input data to a subsequent gating combination which is also gated according to control signals. The synchronous flip flop embodiment may require the use of at least one additional control signal which has a steady state phase relationship which is the inverse of the second control signal. If the signals are not properly ordered, the gates may not function as intended.

Therefore, it is an object of this invention to provide a gating arrangement using similar components and relatively reduced logic gates for mechanizing a flip flop function.

It is another object of this invention to provide a device responsive to input signals for mechanizing a flip flop function with as few as two delay causing logic combinations.

It is still another object of this invention to provide an improved gating arrangement for producing output signals translated from input signals with a reduced number of delays.

Still a further object of this invention is to provide a combination of gating arrangements producing output signals which are the inverse of each other and for providing a storage capability.

Still a further object of this invention is provide an improved gating arrangement for storing previously received data at an output while the input is receiving other data.

These and other objects of this invention will become more apparent in connection with the following drawings of which, FIGURE 1 is an illustration of a basic embodiment of the invention;

Figure 1:
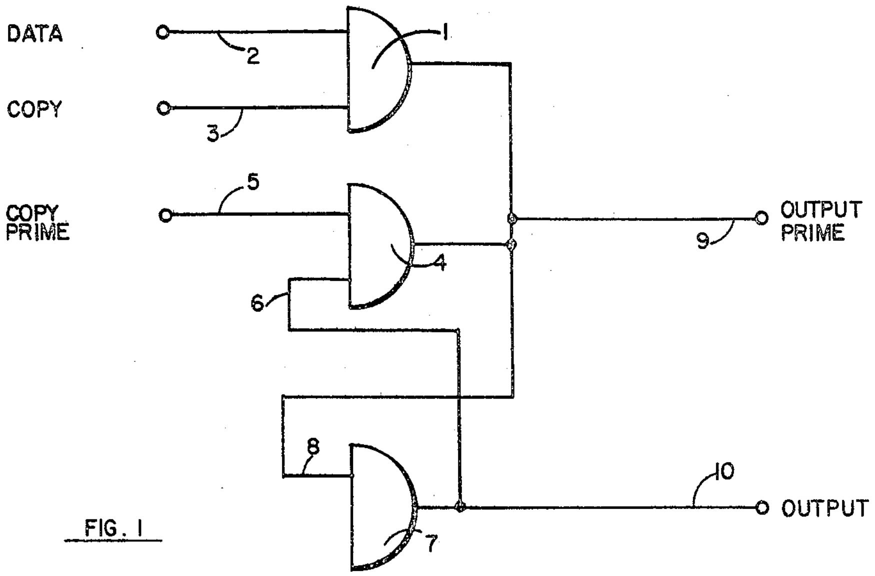

Referring now to FIGURE 1, wherein is shown gate 1 having data signal input 2 and gating signal copy 3. Gate 4 includes the gating signal copy prime 5, and input 6 which is taken from the output of output means 7 shown as a simple gate with one input. The outputs from gates 1 and 4 are connected at a common point and form the single input 8 to gate 7. The outputs from gates 1 and 4 are joined and designated as output prime 9 and the output from gate 7 is designated as output 10. As shown in the FIGURE 1 embodiment, only three gates are necessary to mechanize the flip flop function. In addition, only two logic levels are required. In other words, only two logic delays are incurred in translating or gating the input data from the input to the output. One delay and a phase inversion occurs from input 2 to input 8. An additional delay and phase inversion occurs from input 8 to output 10.

In a preferred embodiment, the copy and copy prime signals are the true inverses of each other or at least with respect to the speed of the circuit, appear to be the true inverses of each other. If this is not true then the copy prime signal must be true before the copy signal becomes false. Otherwise, the flip flop which is mechanized by the gating arrangement, will be set to a logical zero, or false, immediately after the copy signal goes false and information to have been stored by the gating combination is destroyed.

Figure 4:
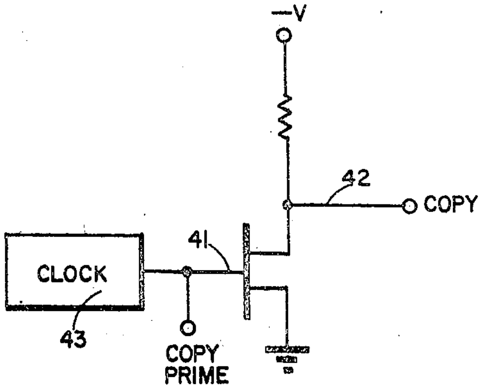
FIGURE 4 is a representation of a gating arrangement for producing an inverted clock signal.

By the addition of a simple circuit as shown in FIGURE 4, connected to clock 43, the relation between the signals is assured. Clock 43 supplies an alternating signal which may be produced for example, by an oscillator circuit or various other circuits and mechanizations believed well known in the state of the art. As shown herein, transistor 40 conducts when copy prime 41 is true, or —V, and copy 42 then becomes false, or approximately zero. Copy 42 is obviously the inverse of copy prime 41 except during the transition period and the transition of copy prime 41 precedes the transition of copy 42. As a result the signals can be utilized in the FIGURE 1 embodiment and other embodiments where nominally inverted signals are required.

Figure 2:
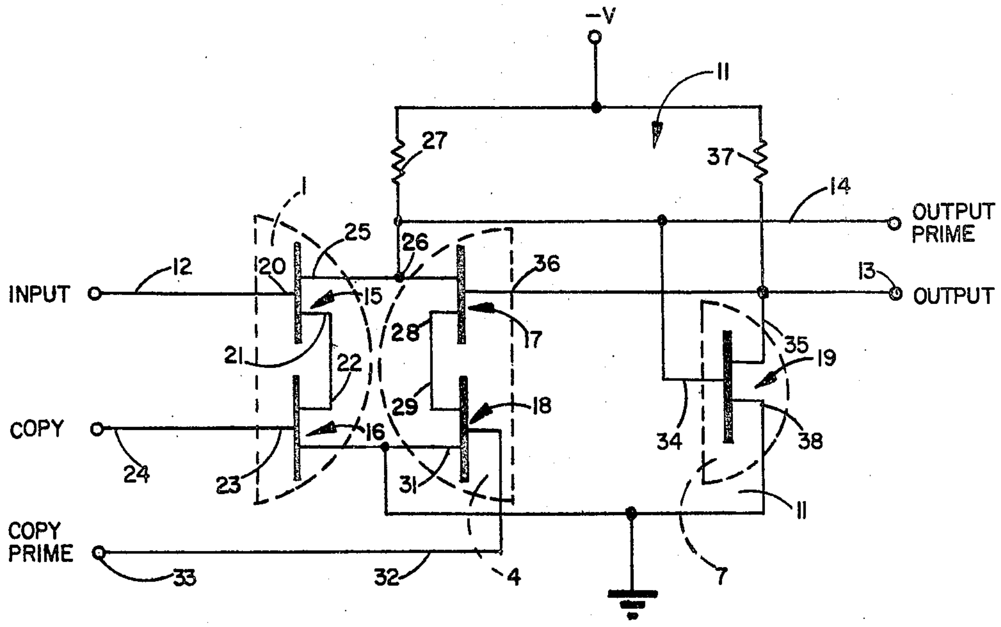
FIGURE 2 is an illustration of an embodiment of the invention using transistors.

Referring now to FIGURE 2 wherein is shown the FIGURE 1 embodiment mechanized by field effect transistors. The gating arrangement mechanizes an asynchronous flip flop 11 having input 12, output 13 and output prime 14. The flip flop comprises field effect transistors 15, 16, 17, 18 and 19.

Transistor 15 includes gate electrode 20 connected to the input, source electrode 21 connected to drain electrode 22 of transistor 16. Transistor 16 also includes gate electrode 23 connected to copy input 24.

Drain electrode 25 of transistor 15 and drain electrode 26 of transistor 17 are connected at a common point. A source of voltage potential, —V, is connected through resistor 27 to the common connection between the electrodes. Transistors 15 and 16 comprise gating means 1 shown in FIGURE 1.

Source electrode 28 of transistor 17 is connected to drain electrode 29 of transistor 18.

The source electrodes 30 and 31 of transistors 16 and 18, respectively, are connected at a common point to electrical ground. The gate electrode 32 of transistor 18 is connected to copy prime input 33. The common point between the drains of transistors 15 and 17 is connected to output prime 14 and to gate electrode 34 of transistor 19. Transistors 17 and 18 comprise gating means 4 shown in FIGURE 1.

The drain electrode 35 of transistor 19 is connected to output 13 and to gate electrode 36 of transistor 17 and has a feedback loop. The voltage source, —V, is also connected through resistor 37 to the drain electrode 35. Source electrode 38 is connected to electrical ground. Resistors 27 and 37 can also be mechanized with other devices such as metal oxide semiconductors. Transistor 19 comprises gating means 7 shown in FIGURE 1.

In operation, when both the input and copy signals are true, output prime is false, O and the output is true —V. Copy prime is false during this interval. During the next interval, where copy is false and copy prime is true, the output is held true by the positive feedback loop from electrode 35 of transistor 19 to electrode 36 of transistor 17. However, if the input is false when copy is true, transistor 15 is off and output prime 14 goes true causing transistor 19 to conduct, making the output 13 false.

Figure 3:
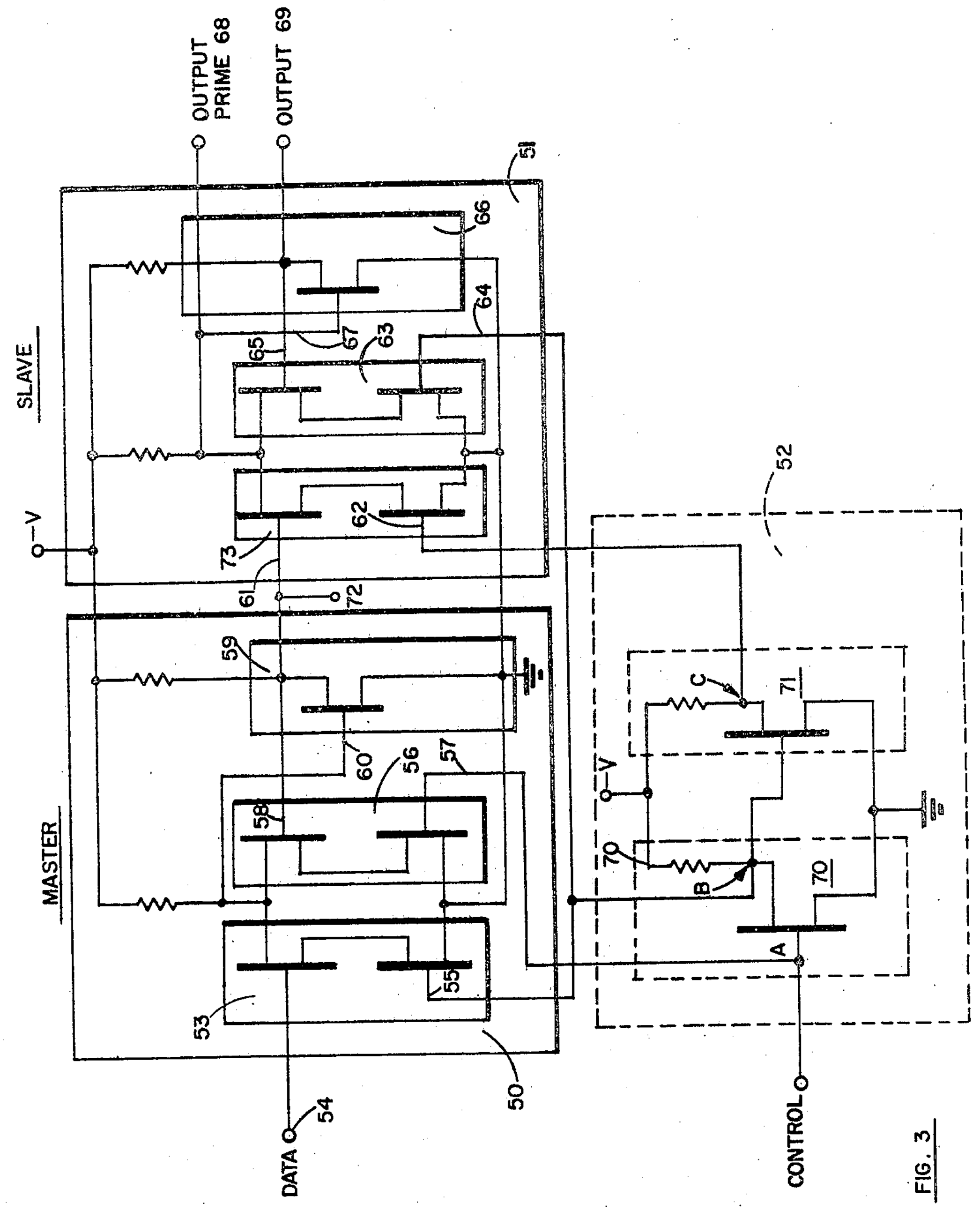
FIGURE 3 is an illustration of a second embodiment of the invention using a combination of gates to mechanize a synchronous flip flop function.

The FIGURE 3 embodiment combines two of the gating combinations shown in FIGURE 2 to form a synchronous flip flop. The combination includes control circuit means to order the copy and copy prime signals with respect to each other to insure proper operation of the circuit.

The FIGURE 3 embodiment comprises a first flip flop 50, designated as the master flip flop and a second flip flop 51 designated as the slave flip flop. The control circuit 52 generates the control signals. Circuits 50 and 51 are similar to the flip flop circuit described in connection with FIGURE 2.

Flip flop circuit 50 comprises gate 53 having data input 54 and copy signal input 55 designated as signal B. The flip flop further comprises gate 56 having copy prime input 57 designated as signal A, and feedback input 58 from the output of gate 59. Gate 59 includes input 60 taken from the common outputs of gates 53 and 56.

Flip flop 51 comprises gate 73 having input 61 which is connected to the output of gate 59 and input 62 which is connected to a second copy prime signal C.

Gate 63 includes signal input 64 which is connected to the copy signal B and feedback input 65 from the output 69 of gate 66. Gate 66 includes input 67 taken from a common connection of the output of gates 73 and 63. The common output from the gates 73 and 63 also comprises output prime 68. The output from gate 66 also comprises the input to gate 63.

The control circuit 52 comprises gates 70 and 71. The output from gate 70 is the copy signal B to flip flops 50 and 51. The output from gate 71 is the copy prime signal C to flip flop 51. The input to gate 70 is also the copy prime signal A to flip flop 50. It has the same steady state phase as does signal C. During the transient period when transistors 70 and 71 are changing states, the signals may have a different relationship.

Figure 5:
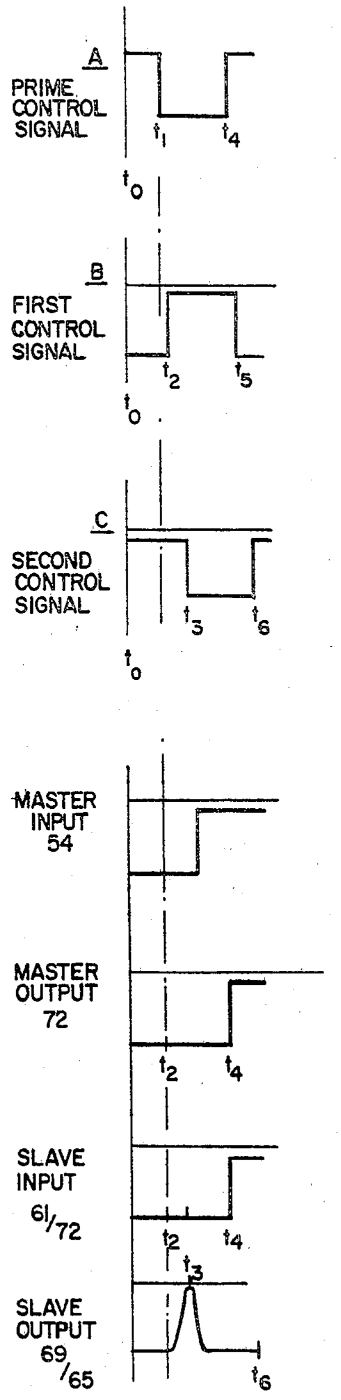
FIGURE 5 is a representation of the relationship between control signals and the input and output signals.

The general operation of the circuit can best be understood by briefly describing what happens throughout the circuit as a result of sequencing the A as shown in the following table, and by the specific example illustrated in FIGURE 5.

| Signals: A | B | C | Time | Master (50) | Slave (51) |
|---|---|---|---|---|---|
| F | T | F | $t_0$ | Input enabled | Feedback enabled. |
| T | T | F | $t_1$ | Feedback enabled input enabled | Do. |
| T | F | F | $t_2$ | Feedback enabled | Goes to 0. |
| T | F | T | $t_3$ | do | Input enabled. |
| F | F | T | $t_4$ | Goes to 0 | Do. |
| F | T | T | $t_5$ | Input enabled | Feedback enabled input enabled. |
| F | T | F | $t_6(t_0)$ | do | Feedback enabled. |

As shown in the figure and the table, the control circuit 52 has attained steady state at times $t_0$ ($t_6$) and $t_3$. At $t_0$ time B is true and A is false, thus enabling the input data 54 to be gated to the output 72. Times $t_1$, $t_2$, $t_4$ and $t_5$ are transient times that last for a duration of one gate delay time.

Generally, at $t_0$ time, A is false thus gate 56 is disabled (cut off). Since B is true gate 53 is enabled causing input 60 to gate 59 to be the inverse of the input 54. When a gate is enabled it is cut on if all the inputs are true. Even if it is not cut on, the circuit is affected by the state of the input. Gate 59 thus causes output 72 to be the same as the input 54. Since C is false, gate 73 is disabled. Since B is true gate 63 is enabled causing input 67 to gate 66 to be the inverse of the output 69 which is simultaneously the input 65 of gate 63. This condition causes the output 69 to maintain its current state (which is a function of a previous state of input 61). As shown in the FIGURE 5 example, the output is initially true —V.

At $t_1$ time, A becomes true thus gate 56 is enabled. This insures that output 72 will maintain whatever state it attained during $t_0$ time (assuming that input 54 is not changing to true at this time. Also as indicated in FIGURE 5, the output 72, master output, is true —V during this time. Input 54 will not be changing if as in most cases it is generated by logic which is controlled exclusively by slave flip flop 51 and/or similar slave flip flops since they are not changing because B and C have not changed. If input 54 is changing, since not generated exclusively by logic controlled by slave flip flops, then either state for flip flop 50 is acceptable.

At $t_2$ time, B becomes false thus gate 53 is disabled. This insures that output 72 will maintain whatever state is attained during $t_1$ (in most cases this state is held over from $t_0$) even if the input 54 changes. Since B and C are false, if output prime 68 changes, it will start to go true. If output 69 changes, it will start to go false. This is a transient condition which is not desired but does not impair circuit function. Gate 53 is disabled at least one gate delay time before input 54 could have changed to true (assuming that it is generated by logic controlled exclusively by slave flip flops). This worst case occurs if input 54 is connected directly to an output prime 68 of slave flip flop 51 or a similar slave flip flop.

For the exmaple under consideration, B becomes false before C becomes true and output 69 which was true starts to go false until $t_3$ time, when gate 73 is enabled. Since A became true prior to the time B became false, the input signal which was true during the time B was true is held true until $t_4$ time.

At $t_3$ time C becomes true. This does not cause any change in master flip flop 50. However, since C becomes true gate 73 is enabled causing slave flip flop 51 to copy the state of the master flip flop 50.

At $t_4$ time A becomes false thus gate 56 is enabled. Since A and B are false the noded output of gates 53 and 56 which is the input of gate 57, starts to go true, if it changes, and then the output 72 of gate 59 starts to go false, if it changes. Two gate delay times are required before output 72 can change and if it changes, it will be going false. Slave flip flop 51 does not change since B and C are not changing and input 61 cannot change for two gate delay times. At $t_4$ time, for the FIGURE 5 example, gates 53 and 56 are disabled because A and B are false and the output 72 goes false until $t_5$ time. However, at $t_5$ time, since the input is false, the output remains false.

At $t_5$ time, B becomes true thus gate 53 is enabled and master flip flop 50 starts to copy the state of the input 54. Since $t_4$ time lasted for only one gate delay time, output 72 has not yet changed from whatever state it had at the beginning of $t_4$ time. Two gate delay times are required before output 72 can attain the state of the input 54. Since B becomes true gate 63 is enabled. This insures that slave flip flop 51 will maintain whatever state it attained during $t_3$ time assuming that input 61 is not changing to true. Input 61 may be changing during this time period but if it is, it is changing to false.

At $t_6$ time (same as $t_0$) C becomes false which disables gate 60. This insures that the slave flip flop will maintain whatever state it attained during $t_3$ even if the input 54 comes true. The cycle then repeats itself.

Although the invention has been described and illustrated in detail, it is to be understood that the same is by way of illustration and example only, and is not to be taken by way of limitation; the spirit and scope of this invention being limited only by the terms of the appended claims.

I claim:

1. Gating means comprising at least two inverting "and" gates and a first inverter comprising an interval delay, one of said "and" gates connected to receive an input signal and a first control signal, the other of said "and" gates connected to receive the prime of said control signal and the output of said delaying inverter, the outputs of said "and" gates are connected together and to the input of said inverter.

2. The combination as recited in claim 1 wherein is included a second combination of two inverting "and" gates and a second inverter comprising an interval delay, one of said second combination of "and" gates connected to receive an input signal from the output of the first delaying and a second control signal which is the prime of the first control signal, the other of said "and" gates connected to receive a second prime control signal which is the prime of said second control signal and the output of the said second delaying inverter, the outputs of said "and" gates are connected together and to the input of said second inverter.

3. The combination as recited in claim 1 wherein said second primed control signal is said first control signal.

4. Signal responsive means comprising at least first output means having input and an output, first input gating means having a data signal input and a first control signal input for gating the inverse of said data signal to the input of the first output means, said output means including means responsive to the inverse of said data signal for providing an output signal which is the inverse of its input signal, said first input gating means further including a feedback and a second control signal input for holding said data signal at the output of said output means, said feedback being connected from said output to said first input gating means, said first input gating means comprising a single logic level.

5. The combination as recited in claim 4 wherein said output means comprises a semiconductor device having a single logic delay.

6. The combination as recited in claim 4 wherein is included means for generating said control signals so that the second signal becomes true no later than the time the first signal becomes false.

7. The combination as recited in claim 4 including a second output means having an input and an output, a second input gating means having a second data signal input connected to receive said first output data signal and a third control signal input for gating data signal from the input thereof to the input of the second output means, and second feedback and fourth control signals for holding said data at the output, said first and fourth control signals having the same phase relationship and said second and third control signals having the same phase relationship.

8. The combination comprising a first gating means having a data input and a control signal input and a first output, second gating means having a control signal prime input, a second input and a second output connected to said first output, a third gating means having a first input connected to the first and second outputs, and a third output, said third output being connected to said second input, means for generating signals for said control and control prime inputs which produces the true state of said control prime signal no later than the false state of said control signal.

9. The combination as recited in claim 8 wherein is added a fourth gating means having a fourth input connected to said third output, a fourth control signal prime input, and a fourth output means,
- a fifth gating means having a fifth control signal, a fifth input and a fifth output connected to said fourth output,
- a sixth gating means having a sixth input connected to the fourth and fifth outputs, said sixth output being connected to said fifth input, a sixth output prime connected to the fourth and fifth outputs.

References Cited

I.B.M. Technical Disclosure Bulletin "Multifunction Logic Circuit," by Waxman, vol. 8, No. 3, August 1965, pp. 353–354.

JOHN S. HEYMAN, Primary Examiner

B. P. DAVIS, Assistant Examiner

U.S. Cl. X.R.

307—205, 215